Figure 2:
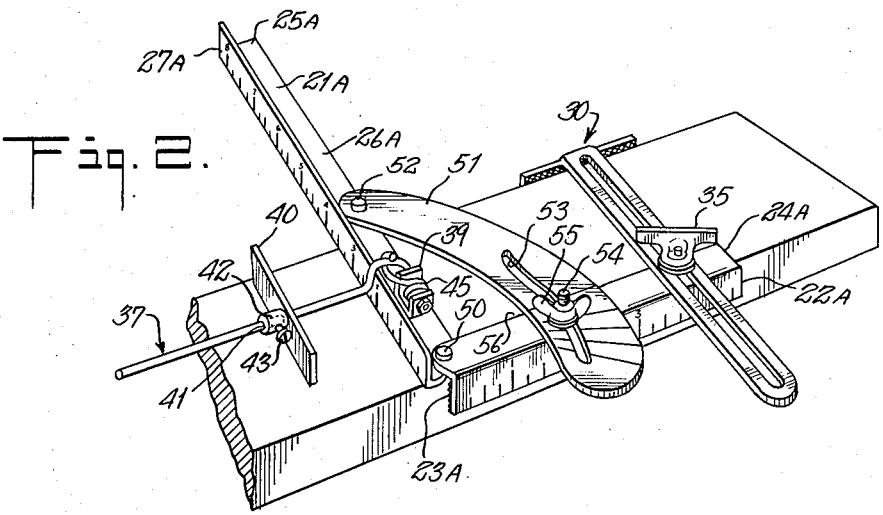

Dec. 11, 1956 L. M. HOPLA 2,773,523
GUIDE DEVICE FOR PORTABLE POWER SAWS
Filed April 29, 1952 4 Sheets-Sheet 1
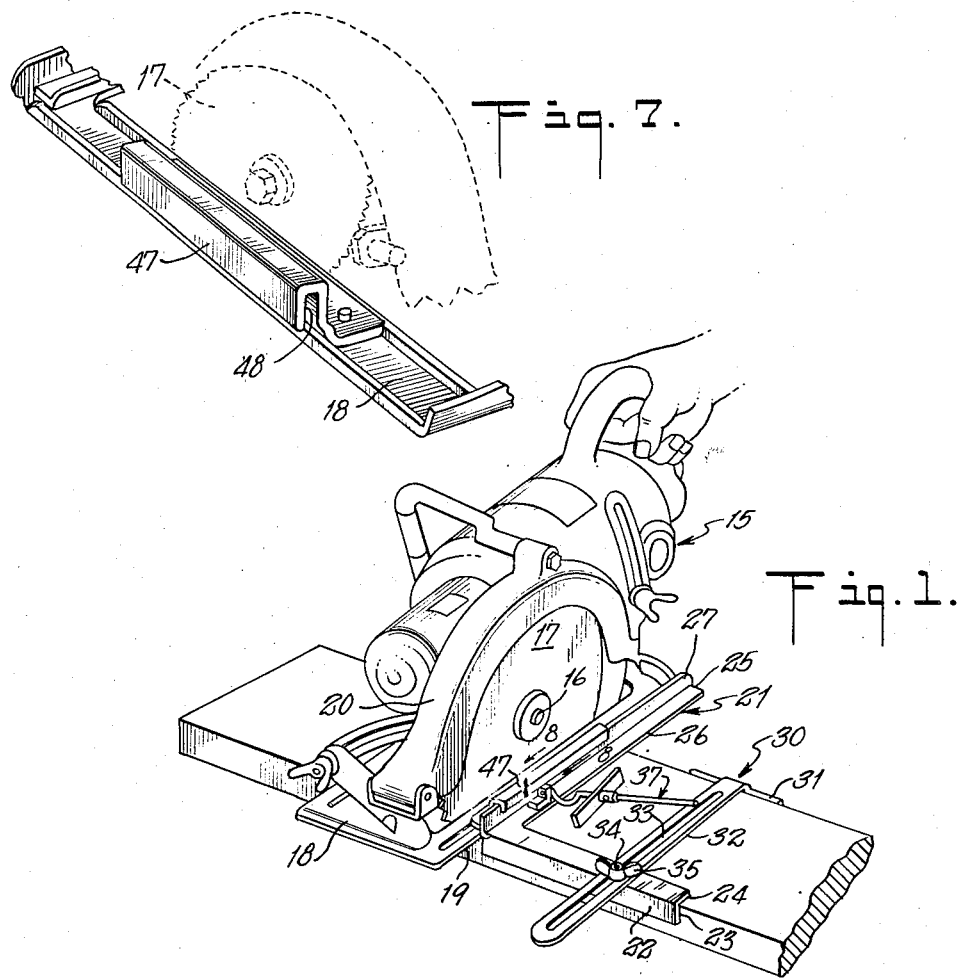
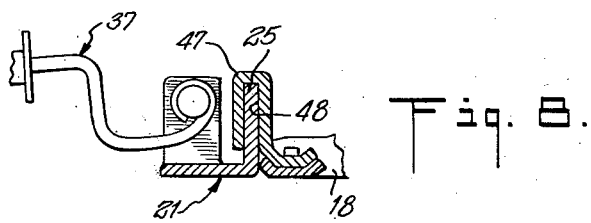
INVENTOR
LLOYD MELVIN HOPLA
BY
ATTORNEY Dec. 11, 1956 L. M. HOPLA 2,773,523
GUIDE DEVICE FOR PORTABLE POWER SAWS
Filed April 29, 1952 4 Sheets-Sheet 2

INVENTOR
LLOYD MELVIN HOPLA
BY Howard J. Jeanbron
ATTORNEY

Dec. 11, 1956 L. M. HOPLA 2,773,523
GUIDE DEVICE FOR PORTABLE POWER SAWS
Filed April 29, 1952 4 Sheets-Sheet 3
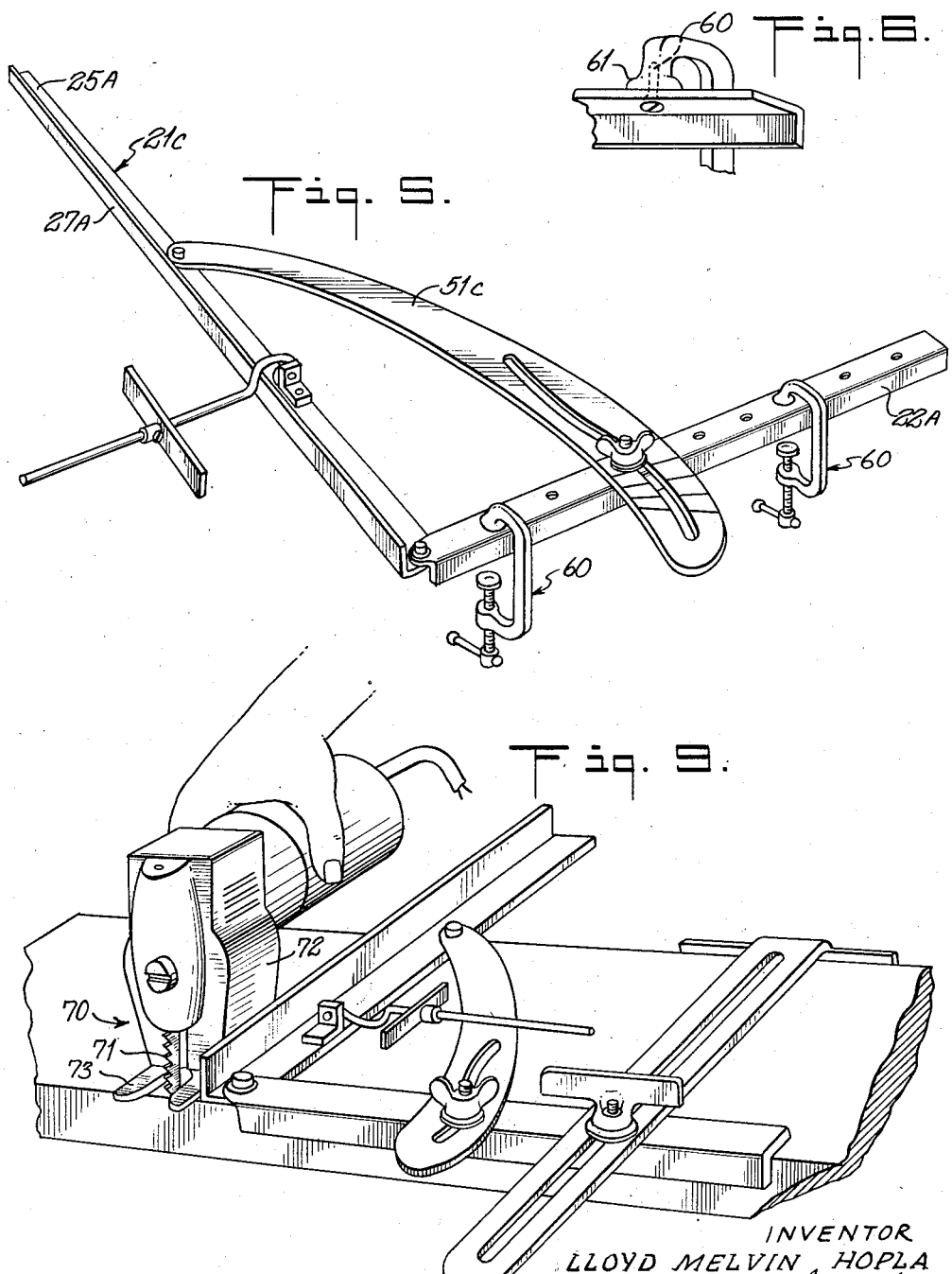
INVENTOR
LLOYD MELVIN HOPLA
BY Howard T. Jeandron
ATTORNEY Dec. 11, 1956    L. M. HOPLA    2,773,523
GUIDE DEVICE FOR PORTABLE POWER SAWS
Filed April 29, 1952    4 Sheets-Sheet 4
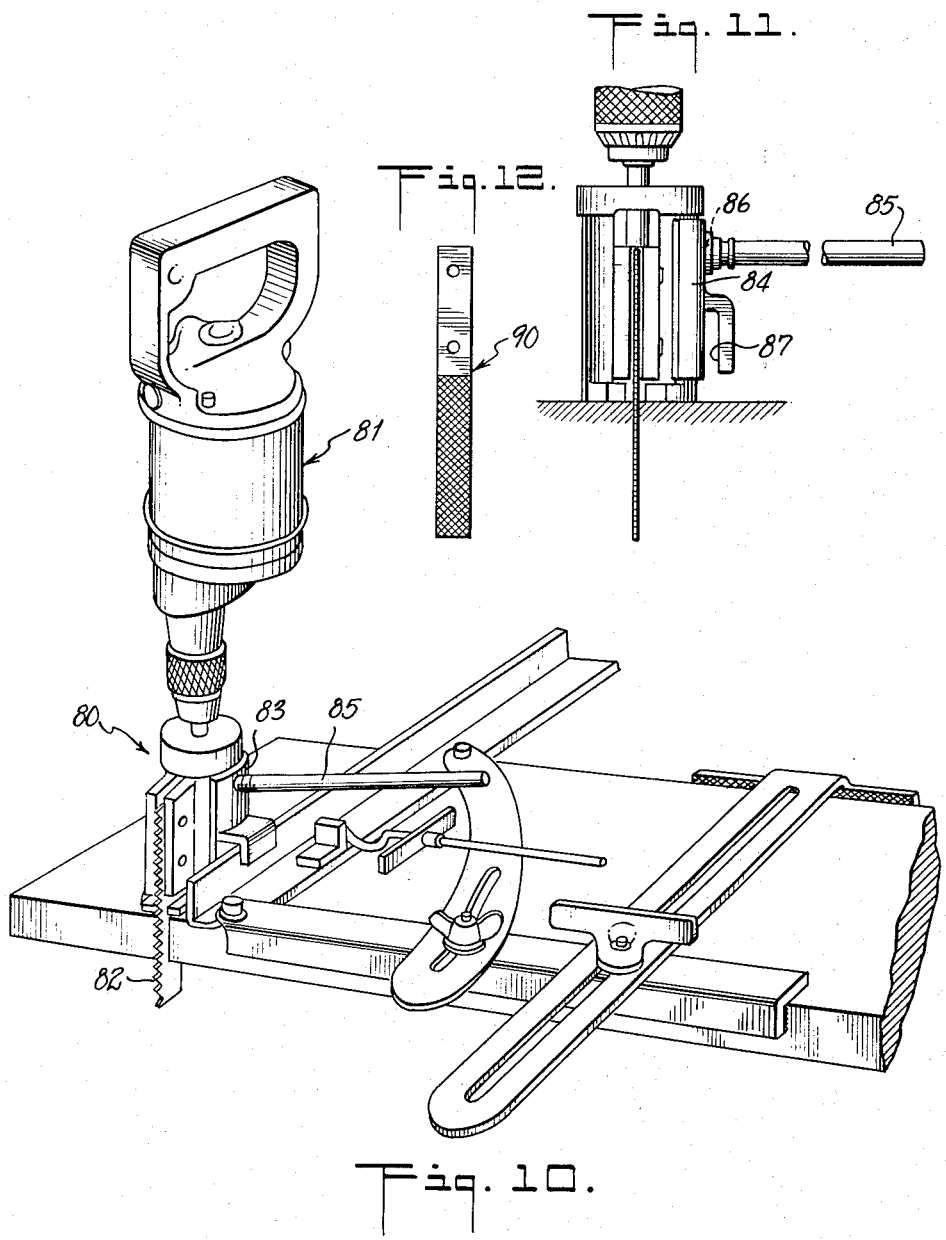
INVENTOR
LLOYD MELVIN HOPLA
BY
ATTORNEY

United States Patent Office 2,773,523
Patented Dec. 11, 1956

2,773,523

GUIDE DEVICE FOR PORTABLE POWER SAWS

Lloyd Melvin Hopla, Keyport, N. J.

Application April 29, 1952, Serial No. 284,857

5 Claims. (Cl. 143—6)

This invention relates to portable power driven saws and more particularly to a saw guide. Power hand saws of the type referred to are used extensively for cutting wood and other materials. The power saw comprises a housing in which an electric motor is mounted and the motor in turn is operatively connected to an arbor on which the circular saw blade is mounted. In some instances the housing is supported on a flat frame, platform or bed on which the saw rests. With a power saw it is desirable to have a guiding means during the cutting operation to effect greater accuracy and this invention is primarily concerned with this guiding means. In this invention the guide is not necessarily attached to the power saw and the user may readily utilize the saw with or without the guide according to the cutting operation. There have been numerous devices for guiding power operated saws and for supporting the saw in a fixed position for sawing operations. However these devices are either appreciable in size and weight or their cost prohibitive.

The object of this invention is to provide a guide for power saws that will greatly increase their usefulness and accuracy without detracting from their normal use.

A further object of this invention is to provide a guide for power saws that is not affixed to the saw and is simple in construction, light in weight and easily affixed to the work for a cutting operation.

A still further object of this invention is to provide a guide for power saws in which the guide is first affixed to the work to be cut and in which the power saw bears against the guide and is not supported by the guide during the operation.

A still further object of this invention is to provide a guide for power saws in which the guide is first affixed to the work to be cut and in which the power saw is provided with an attachment to mate with the guide and in which the saw is guided and partially supported during the cutting operation.

A still further object of this invention is to provide a guide for all types of power operated saws and in which means are provided to position said guide a predetermined distance from the cutting operation depending upon the position of the saw blade with relation to the supporting platform for the saw.

A further object of this invention is to provide a power operated saw guide above the working surface to which it is attached and in which means are provided to pivotally move said guide to a predetermined position to guide the power saw in an angular cut.

A further object of this invention is to provide a vertically adjustable guide for power operated hand saws in which the guide is secured to the upper surface of the work in a manner to guide the power saw directly across the work and at right angles thereto or at oblique angles thereto.

A still further object of this invention is to provide a power operated saw guide above the working surface to which it is attached and in which means are provided to pivotally support a curved guide to guide the power saw in a predetermined curved cut.

A further object of this invention is to provide a guide for power operated saws in which the guide is affixed to the work by means of C clamps and in which the guiding arm may be of exceptional length for large work.

A further object of this invention is to provide a guide for power operated hand saws in which the guide is clamped to the work and supported on the top surface of said work and in which the guiding surface is spaced a predetermined distance from the cutting operation.

A still further object of this invention is to provide a guide for power operated hand saws in which the guide is clamped to the work and supported on the top surface of said work and in which the guide is provided with calibrations so that the guide may be used as a calibrated square as well as the guiding means for the power saw.

A still further object of this invention is to provide a guide for power operated tools in which the guide is clamped onto the top surface of the work during the work operation.

Figure 3:
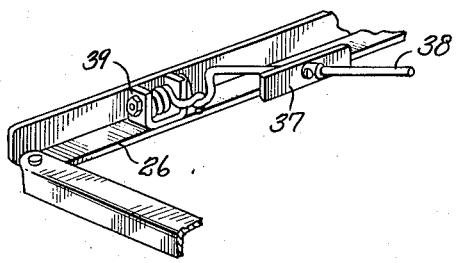
Figure 4:
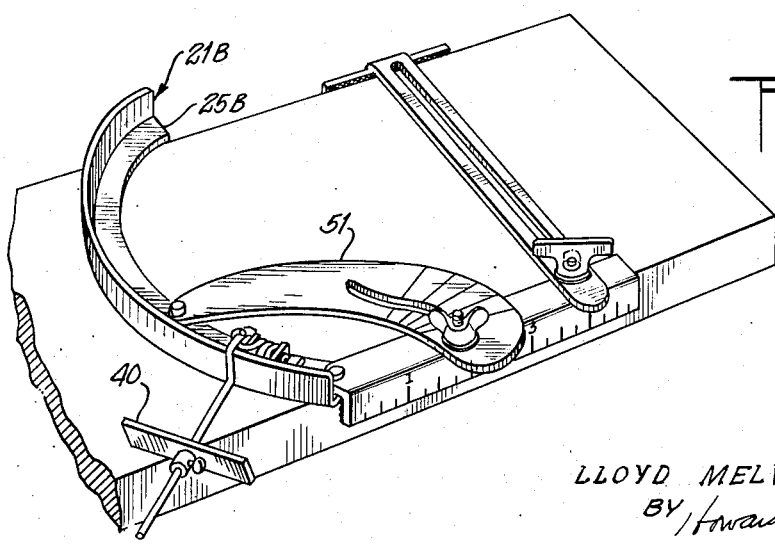

Other objects of this invention may be apparent by reference to the accompanying detailed description and the drawings in which Fig. 1 is a perspective view illustrating a circular hand saw partially supported and guided by a cross cut saw guide, Fig. 2 is a perspective view of the power operated hand saw guide affixed to a piece of lumber, Fig. 3 is a perspective view showing the adjustable gauge in its normal out of the way position, Fig. 4 is another embodiment of this invention, Fig. 5 is a perspective view of a still further embodiment of this invention, Fig. 6 is a partial detail of the C clamp showing its attachment to the guide illustrated in Fig. 5.

Fig. 7 (Sheet 1) is a perspective illustration of the attachment for the circular saw illustrated in Fig. 1, Fig. 8 is a cross sectional view taken on line 8—8 of Fig. 1, Fig. 9 (Sheet 3) is a perspective view illustrating another type of electric saw utilized in conjunction with the saw guide, Fig. 10 is a still further type of power operated hand saw utilized in conjunction with the saw guide, Fig. 11 is a view partially in cross section illustrating the attachment shown in Fig. 10, and Fig. 12 is an elevational view of a file which may be mounted the same as the saw blade in Fig. 11.

Referring to the drawings and more particularly Fig. 1 there is indicated a power hand saw 15 in which an arbor 16 supports a saw blade 17. The saw 15 is supported on a base or platform 18 and it is to be noted that the saw blade 17 is supported within the platform 18 and thus the cut of the blade 17 will be spaced a predetermined distance from the parallel outer edge 19 of the platform 18. In utilizing the power saw for a cross cutting operation, it is difficult to keep the cut of the blade 17 on a definite line because of the obstructions to the vision of the operator. The blade 17 is necessarily provided with a guard 20 so that the operator cannot sight down the blade 17 and because of the platform 18, the blade 17 cannot be sighted from the side in a cutting operation. Therefore it is necessary to provide some sort of guiding means for the platform 18 to insure a straight even cut on a predetermined line. This invention provides a guide which is specifically designed to produce the exact guidance necessary for this type of saw. The saw guide comprises in this instance a right angular shaped angle iron 21 in which the base 22 is provided as the straight edge used to abut with one side of the work to be cut and is therefore shaped in a right angular formation with an abutting face 23 and a supporting face 24. The guide arm 25 of member 21 is provided with a supporting face 26 that is in the same plane as face 24 of the base member and an upright face 27 as the guiding edge for the power tool to bear against. In order that the element 21 may be affixed to a piece of lumber, there is provided a T shaped element 30 in which the head of the T 31 is formed at a right angle to the stem 32 of the T so that the inner face of the head 31 may bear against the side of the lumber. The stem 32 of element 30 is provided with an elongated slot 33. The base 22 of element 21 is provided with a threaded bolt 34 that extends upward from face 24. Bolt 34 and slot 33 are of a size to permit the bolt 34 to pass through slot 33 and a wing nut 35 is provided to secure the stem 32 of element 30 in any predetermined clamped position as illustrated in Fig. 1. Thus it is apparent that the guide 21 may be secured by means of element 30 to any piece of lumber up to the maximum extension of element 30. Of course the length of the guide face 27 should be of the same approximate length as the stem 32 of element 30. An additional feature of this particular guide is the gauge 37 which is more clearly illustrated in Figs. 2 and 3. The gauge 37 comprises a pivotally supported wire or rod 38 pivotally attached to an element 39, element 39 in turn being welded or affixed to the supporting face or web 26. An adjustable flat sighting or marking blade 40 is provided with an aperture 41 and affixed by welding or otherwise to a collar 42. The collar 42 is also provided with an aperture to fit over the rod 38. The collar 42 is also provided with a set screw 43 so that the collar may be positioned anywhere along the length of rod 38 yet it may be temporarily set by means of the set screw 43 in a particular position as illustrated in Fig. 2. This position is determined by the particular type or make of power saw being utilized as the distance, referring to Fig. 1, from the bearing edge of the platform to the position of the cutting teeth of the blade 17 will vary. Having determined the distance for the saw to be utilized, blade 40 may be set on rod 38 thus preparing the guide 21 for use with a power saw. A further improvement provided with the gauge 37 is a retractable spring 45. In this instance a coiled spring that is coiled about the pivotal supporting bolt and in which one end of the coil is looped around the base of rod 38 while the opposite end of the coil is affixed to element 39 and in its normal position the gauge 37 will be retained in the position illustrated in Fig. 3. However when the guide is to be set with relation to a desired cut, rod 38 is simply flipped over by finger pressure to bring the gauge into the position illustrated in Fig. 2 with the blade 40 lining up directly with the intended saw cut. Having positioned the guide 21 in this manner, the guide may then be affixed by moving the member 30 and member 21 into a tight gripping relationship with the lumber as illustrated in Figs. 1 and 2 and fastening the wing nut 35 into a tight gripping relationship with stem 32. It is apparent that the sighting gauge and especially blade 40 may be readily adjusted on rod 38 to adapt the guide to any make of saw. Referring again to Fig. 1, although I have described the saw 15 as being applied to the face of the lumber to be cut and using the guiding face 27 as the means of sliding the edge 19 of platform 18 in abutting relationship, this is one manner of utilizing the guide to produce the desired cut. A further embodiment of this invention is illustrated in Figs. 7 and 8 in which a U shaped element 47 is attached to the platform 18 in parallel relationship with the saw blade 17. Element 47 may be bolted to the platform 18 or attached in any similar fashion as illustrated in Figs. 7 and 8. Element 47 is formed with an internal slot 48 of an exact dimension to fit onto and slide over the face 27 and upright web of the angle or arm 25 of the guide member 21. Referring to Fig. 1 it is apparent that the saw 15 may be readily lifted from the work at any time but during the cutting operation element 47 will ride upon the web and face 27 to limit the movement of saw 15 to a single plane of movement namely at right angles to the board or lumber being cut. This type of attachment prevents the movement of the saw 15 away from the face 27 of element 21 yet permits an easy movement in the direction in which the blade is cutting.

Referring to Fig. 2 there is illustrated a further embodiment of the saw guide. In this instance the guide 21A is similar to the guide 21 of Fig. 1 except that the two legs 22A and 25A are separate elements that are pivotally attached by a bolt 50. Element or leg 22A is similar to the base 22 of element 21 while the leg 25A is similar to the guide arm 25 of the guide 21. Similarly a T shaped element 30 and wing nut 35 is also provided to provide the means to secure the guide 21A in the same fashion in which guide 21 is secured. In addition there is provided an adjustable arm 51 that is pivotally affixed by a bolt 52 to the web or face 26A. Element 51 at its opposite end is provided with a slot 53 of a predetermined curvature. A threaded bolt 54 is mounted through the face or web 24A and fitted through the slot 53 and a wing nut 55 is provided to be threaded on bolt 54. Arm 51 is provided with a plurality of calibrations at the slotted end and by means of the edge 56 of the web 24A the arm 51 may be set with any of these calibrations aligning with edge 56 and in turn positioning the guiding face 27A in a desired position for guiding the saw for a particular cut. Although I have marked these calibrations that may be degrees of 30° to 90° however it is apparent that additional calibrations may be provided to produce a positioning of the guide between the minimum and maximum angular cut.

A further improvement to be noted is the inner or gripping face of the element 30 and the inner or gripping face 23A of the leg 22A. In clamping various types of a material it is necessary to provide a roughened face or a sand paper finished face of these surfaces so that the clamp when set will not move due to the pressure exerted against the guiding face 27A by the power saw.

Referring to Fig. 4 I have illustrated a further embodiment of this invention in which a saw guide 21B is illustrated. The guide 21B is similar in all components to guide 21A except that arm or leg 25B is formed as a curved or predetermined shape other than a straight leg as illustrated in Fig. 2. Although I have illustrated leg 25B of a predetermined radius it is apparent that leg 25B may be interchangeable with various elements to produce a different curvature and therefore a different cut as desired. It is also apparent that in Fig. 4 the calibrations on element 51 would not be utilized as the leg 25B would be set according to the curvature already predetermined, that is, the guide 21B would be positioned on the lumber or board and with a pencil a mark could be inscribed to determine the cut desired. The guide 21B would then be moved to the right, Fig. 4, until the gauge blade 40 lined up with the end of the cut as marked. Thus, the distance that was predetermined for the particular saw will be set and the guide 21B is then ready for the cutting operation. It is further apparent that the curvature of element 25B cannot be of too small a radius when a circular saw is utilized. However if any of the straight blade type power saws are used there is no limitation on the curvature of element 25B.

Referring to Fig. 5 there is illustrated a slightly modified form of a saw guide 21C that is similar to guide element 21A except that in this instance the leg 25A is much longer for use with large sheets of lumber such as plywood and likewise the straight edge or base 22A will be longer to provide the necessary support and in view of the longer legs, element 51C is designed with a longer sweep to accommodate the longer legs of the guide. Otherwise element 51C is similar to element 51 of Figs.

2 and 4. In this embodiment of the invention the straight edge or base 22A is retained against the straight edge of the lumber to be cut by means of a plurality of C clamps 60. The C clamps 60 may be separable from the leg 22A and thus positioned anywhere along leg 22A or as illustrated in Fig. 6, the C clamps 60 may have the upper contact face attached to the upper web of the leg 22A by spot welding or by a screw insert 61 as illustrated in Fig. 6. Thus in this fashion the C clamps will remain with leg 22A and are not easily lost or misplaced. The operation and construction of the C clamps 60 are otherwise standard. The size of C clamp utilized depends upon the depth of cut of the saw to be utilized, the particular saws rarely exceeding an 8" cut and in most instances a great deal less. It is apparent that with a guide as illustrated in Fig. 5 that large sheets of plywood may be easily clamped by the guide and the guiding face 27A will permit a power operated saw to make a long and accurate cut.

Referring to Fig. 9 there is illustrated a power saw guide similar to that illustrated in Fig. 2 but in this instance I have illustrated a different type of power saw 70. In this instance the power saw is provided with a straight blade 71 having a reciprocating motion and it is to be noted that the blade 71 is not positioned in an easily accessible sighting position, rather the saw housing 72 and supporting fingers 73 prevent an accurate sighting of the cutting edge. Therefore the saw guide illustrated is again useful and the gauge 37 may be adjusted so that the blade 40 is positioned the desired distance for this particular type of saw. With the gauge set in position for a cutting operation, the operator may hold the saw 70 so that the housing 72 bears against the face 27 and by a slight pressure the saw may be retained in this position and moved across the board or lumber to be cut as illustrated in Fig. 9.

Referring to Figs. 10 and 11 there is illustrated the same saw guide 21 as in Fig. 2 but in this embodiment there is illustrated a still further type of power operated hand saw 80. This saw is an attachment for a power drill 81 but otherwise the saw 80 is somewhat similar to the saw 70 of Fig. 9 in that it is provided with a straight blade 82 that is moved in a reciprocating motion. In this instance because of the round shape of the housing 83, it would be difficult to retain the saw 80 in a set position by simply bearing against the face 27A of the guide. Therefore referring to Fig. 11 the attachment is provided with a shoe 84 that may be affixed to the face of the housing 83 and the manner of attachment illustrated herein is to remove the guide bar 85 from the attachment and mount the shoe 84 in position and by means of an aperture 86 in the shoe 84 the bar 85 may be inserted through the aperture 86 and threadably secured in its normal position to the housing 83 thus retaining the shoe 84 as illustrated in Fig. 11. The shoe 84 is formed with a U-shaped slot 87, the U-shaped slot being cast to fit and conform to the web and guide face 27A of leg 25A. Referring to Fig. 10 it is apparent that with the shoe 84 mounted as described, the saw 80 may be easily moved along the guide face 27A and retained in a parallel cutting position with the guiding face to produce a straight and even cut.

Referring to Fig. 12 there is illustrated a file 90 which may be mounted in the saw attachment 80 and will be retained by the same set screw that are used to hold the saw blade. The file 90 may be of any type according to the work or material to be filed. Normally the leading edge will be used, however both sides of the file are used to smooth a rough cut.

It is apparent that the so-called saw guide illustrated and described in the various embodiments is in truth a guide for a power operated tool. Although I have illustrated the various power operated saws I may similarly use a file or any other cutting tool. It is also apparent that this guide may be used in conjunction with a circular saw or a reciprocating saw and in all instances the guide is provided with a gauging means to predetermine the exact position for the guide to produce the exact cutting position. This is necessary because the various types of saws have the saw blade set at different distances from the guiding edge that is utilized during the sawing operation. It is also apparent that although most of the power operated circular saws are so constructed and of sufficient weight to make the work operation quite easy, that is, in maintaining a desired position such as pressing the saw to bear against a straight guiding edge. However there are some portable power tools that do not lend themselves easily to this type of guided operation. In order that the saw or power tool may be guided in a desired straight cut, the further embodiments of this invention include the necessary U-shaped shoe that may be attached to the power tool and thus the tool may be retained by this shoe. It is also apparent that the saw guide may be utilized for extremely small work and in the further embodiment illustrated in Fig. 5 it may be similarly provided for unusually wide cutting operations. It is also apparent that although the guide is normally used for a simple cross cut operation, the guide is provided with means to preset for a predetermined angular cut or as illustrated in a further embodiment to provide means for a curved cut of a predetermined radius.

Although I have illustrated two particular types of clamps associated with this guide, it is apparent that the clamps may be modified according to the type and size of the guide used without departing from the spirit of this invention and although I have illustrated saw guides both straight and curved and both set and pivotal it is apparent that I may modify the guide face to any predetermined shape or to any predetermined position without departing from the spirit of this invention. It is further apparent that due to the various power tools that may be used, the saw is spaced differently and I have therefore provided means to predetermine or gauge the cutting distance in every instance and this gauge may be varied to cover any cutting operation without departing from the spirit of this invention and this invention shall be limited only by the appended claims.

What is claimed is:

1. The combination of a saw guide and a sighting gauge in which the saw guide that is moveable with relation to the work to be cut includes a first and second arm, said first and second arms pivotally connected at the adjacent ends of said arms, a third diagonal arm pivotally connected to the first arm and adjustably attachable through a slot in said arm to the second arm, said first arm provided with an upturned face and said second arm provided with a downturned face, said upturned face providing a guide track for a power saw, a clamp on the second arm that is provided with means to be secured to the material to be cut, said sighting gauge being a pivotally moving normally retracted sighting gauge that is supported by said first arm, said sighting gauge provided with a sighting blade that may be moved to any position perpendicular to and horizontally along said gauge to indicate a predetermined spaced position from the upturned face of said first arm to determine the saw cutting plane, means to set said sighting blade the same distance from said guide track of said first arm ot agree with the distance of the setting of the saw blade of the power saw from the portion of the saw that rides on said guide track.

2. In a device according to claim 1 in which said trackway is formed according to a predetermined curved pattern.

3. In a device according to claim 1 in which said power driven saw is a circular saw.

4. In a device according to claim 1 in which said power driven saw is a reciprocating saw.

5. The combination of a saw guide and a sighting gauge in which the saw guide that is moveable with relation to the work to be cut includes a first and second arm, said first and second arms pivotally connected at the adjacent ends of said arms, a third diagonal arm pivotally connected to the first arm and adjustably attachable through a slot in said arm to the second arm, said first arm provided with an upturned face and said second arm provided with a downturned face, the upturned face providing a surface for the power saw to bear against, a clamp on the second arm that is provided with means to be secured to the material to be cut, said sighting gauge being a pivotally moving normally retracted sighting gauge that is supported by said first arm, said sighting gauge provided with a sighting blade that may be moved to any position perpendicular to and horizontally along said gauge to indicate a predetermined spaced position from the upturned face of said first arm to determine the saw cuttng plane, means to set said sighting blade the same distance from said guide track of said first arm to agree with the distance of the setting of the saw blade of the power saw from the portion of the saw that rides against said upturned face.

References Cited in the file of this patent
UNITED STATES PATENTS

| | | |
|---|---|---|
| 1,135,941 | Kopinski | Apr. 13, 1915 |
| 1,442,265 | Grandle | Jan. 16, 1923 |
| 1,619,695 | Boese et al. | Mar. 1, 1927 |
| 1,700,189 | Wikstrom | Jan. 29, 1929 |
| 1,785,065 | Aborn | Dec. 16, 1930 |
| 1,787,313 | Houts | Dec. 30, 1930 |
| 1,911,045 | Tinnen | May 23, 1933 |
| 2,256,554 | Epstein | Sept. 23, 1941 |
| 2,632,483 | Jamack | Mar. 24, 1953 |
| 2,651,333 | Spinney | Sept. 8, 1953 |